United States Patent
Prielinger et al.

(10) Patent No.: US 7,934,738 B2
(45) Date of Patent: May 3, 2011

(54) MOTORCYCLE FRAME AND MOTORCYCLE ENGINEERED THEREWITH

(75) Inventors: Robert Prielinger, Vorchdorf (AT); Olaf Seger, Laufen (DE); Andreas Wimmer, Burgkirchen (AT)

(73) Assignee: KTM Sportmotorcycle AG, Mattighofen (AT)

( * ) Notice: Subject to any disclaimer, the term of this patent is extended or adjusted under 35 U.S.C. 154(b) by 669 days.

(21) Appl. No.: 11/899,732

(22) Filed: Sep. 7, 2007

(65) Prior Publication Data

US 2008/0060865 A1    Mar. 13, 2008

(30) Foreign Application Priority Data

Sep. 11, 2006   (DE) .................... 10 2006 042 559

(51) Int. Cl.
*B62K 11/04* (2006.01)
*B62K 19/06* (2006.01)

(52) U.S. Cl. .............. 280/274; 280/281.1; 180/219
(58) Field of Classification Search .......... 280/274, 280/281.1; 180/219, 231, 228; D12/110, D12/111, 117
See application file for complete search history.

(56) References Cited

U.S. PATENT DOCUMENTS

| | | | | |
|---|---|---|---|---|
| D207,289 S | * | 3/1967 | Yetman | D12/110 |
| 3,945,463 A | | 3/1976 | Okano et al. | |
| 4,094,375 A | * | 6/1978 | Doncque | 180/219 |
| 4,170,272 A | | 10/1979 | Smolinski | |
| D275,470 S | * | 9/1984 | Koizumi | D12/110 |
| 4,776,423 A | * | 10/1988 | Buell | 180/228 |
| 4,805,716 A | * | 2/1989 | Tsunoda et al. | 180/219 |
| 5,031,580 A | * | 7/1991 | Takagi et al. | 123/41.42 |
| 5,054,571 A | * | 10/1991 | Takasaka | 180/219 |
| 5,480,001 A | | 1/1996 | Hara | |
| 5,845,728 A | | 12/1998 | Itoh et al. | |
| D496,886 S | * | 10/2004 | Everett et al. | D12/117 |
| 6,837,328 B2 | * | 1/2005 | Neugebauer et al. | 180/225 |
| 2005/0006163 A1 | | 1/2005 | Brendelson et al. | |
| 2005/0178596 A1 | | 8/2005 | Brendelson et al. | |
| 2005/0217631 A1 | * | 10/2005 | Muramatsu | 123/196 R |

FOREIGN PATENT DOCUMENTS

| | | |
|---|---|---|
| DE | 690 06 769 T2 | 11/1990 |
| DE | 101 35 931 C2 | 2/2003 |
| EP | 0 396 939 A1 | 11/1990 |
| GB | 164944 | 2/1921 |
| JP | 60-169387 A | 9/1985 |
| JP | 01-106789 | 4/1989 |
| JP | 02-274677 A | 11/1990 |
| JP | 03136986 A * | 6/1991 |
| JP | 03136987 A * | 6/1991 |
| JP | 04212685 A * | 8/1992 |
| JP | 07-112687 A | 5/1995 |
| JP | 08-216960 | 8/1996 |
| JP | 09-095284 | 4/1997 |
| JP | 2794762 B2 | 9/1998 |
| JP | 3509143 B2 | 3/2004 |
| WO | WO 2005/111395 A2 | 11/2005 |

* cited by examiner

*Primary Examiner* — Lesley Morris
*Assistant Examiner* — Wesley Potter
(74) *Attorney, Agent, or Firm* — Rod D. Baker

(57) ABSTRACT

A motorcycle frame, and motorcycle with the frame as disclosed. There is disclosed a motorcycle frame having tubes extending away from a steering head tube in a three-dimensional trellis composite assembly of frame main tubes, interconnected by frame struts, paired upper and lower frame main tubes oriented, along at least a portion of their lengths, substantially parallel to each other. A single tube is oriented parallel to the lower frame main tubes, and arranged between the upper frame main tubes and the steering head tube.

20 Claims, 5 Drawing Sheets

MOTORCYCLE FRAME AND MOTORCYCLE ENGINEERED THEREWITH

CROSS-REFERENCE TO RELATED APPLICATIONS

This application claims priority to German Patent Application No. DE 10 2006 042 559.6, filed on Sep. 11, 2006, the entirety of which is incorporated herein by reference.

BACKGROUND OF THE INVENTION

1. Field of the Invention

The present invention relates to a motorcycle frames, more particularly to a motorcycle frame having tubes extending away from a steering head tube in a three-dimensional trellis composite assembly, the assembly featuring frame main tubes interconnected by frame struts, and upper and lower frame main tubes oriented paired along at least one portion of their longitudinal extent substantially parallel to each other. The invention relates in addition to a motorcycle having a frame so described.

2. Background Art

A motorcycle frame must always satisfy two prime requirements, namely, for one thing, to take the weight of biker, co-biker, engine and transmission and other fitted components, for another, to ensure with other components of the chassis that the motorcycle affords good handling. Handling here is understood to be the response of the motorcycle as experienced by the biker, which is substantially influenced by the stiffness of the frame. Thus, changes in the stiffness of the motorcycle frame can change the handling of the motorcycle just as much as, for example, a significant change in the power of the engine or weight of the motorcycle.

Frame stiffness is always experienced by the biker when the motorcycle frame experiences a torsional moment. A torsional moment tends to twist the frame, i.e. instilling a twist between a steering head tube or handlebar header tube of the motorcycle frame and a swinging fork pivot bearing of the motorcycle frame, i.e. the location of the motorcycle frame at which the swinging fork responsible for rear wheel compliance introduces forces into the motorcycle frame.

Such a torsional moment acting on the motorcycle frame occurs, for example, when the motorcycle is cornering and the biker simultaneously decelerates the motorcycle. This deceleration is usually caused by actuating of the front wheel brake, resulting in a significant change in the distribution of the wheel loading of the motorcycle as compared to straight-on level travel. Once the biker has negotiated the bend with his motorcycle, the distribution of the wheel loading again changes, because the biker accelerates the motorcycle out of the bend which displaces the wheel loading mainly to the rear wheel. When this happens, the motorcycle is still slanted and due to the increasing speed the biker leans further to the inside of the bend at the same time as the wheel loading is further shifted in the direction of the rear wheel. When the motorcycle frame is engineered with relatively low stiffness, this results in elastic deformations of the frame detrimental to dynamic handling.

The biker has to compensate these elastic deformations by changing his response, for instance by changing the assumed line of travel, reducing engine power output, changing his seating posture relative to the yaw axis of the motorcycle, and so on. All of these actions result ultimately in delayed action of the motorcycle, as compared to a motorcycle having a stiffer motorcycle frame, to the detriment of dynamic handling. Subjectively too, low stiffness of the motorcycle frame is experienced by the biker as a disadvantage, as the motorcycle imparts a fuzzy feel in responding to the wanted action of the biker merely indirectly and delayed.

Thus, a motorcycle frame of low torsional rigidity experiences greater elastic deformations when loaded with a pre-defined torsional moment than a motorcycle frame having higher torsional rigidity. This is particularly significant for motorcycles designed for dynamic handling more often involved in changes in wheel load distribution and cornering than in normal travel. Increasing the torsional rigidity of the motorcycle frame can be achieved by increasing the dimensions of individual segments, for example frame main tubes or frame struts of the motorcycle frame, which is, however, contraproductive from the viewpoint of the increase in the mass of the motorcycle frame.

Motorcycle frames are available in a wealth of different embodiments. Thus, single loop frames already exist in which a single tube extends from the steering head tube and envelops the engine to fork in the region of the swinging fork pivot bearing. Likewise known are bridged frames which bypass the engine. In another known frame principle, the so-called double loop frame, two tubes extend from the steering head tube, passing the engine up to the swinging fork pivot bearing, and then back to the steering head tube. These return tubes are usually termed bracings. Also known in addition are sheet metal profile frames, consisting of two interwelded pressed steel half-shells. Other known types are so-called monocoque frames which, however, are less popular in motorcycle engineering. Lastly, also known are tubular trellis frames featuring a three-dimensional composite arrangements of frame tubes interconnected by frame struts.

In one such tubular trellis frame, the frame is configured similar to a trussed structure in which the engine as an integral component can contribute towards stiffening the frame and is thus configured as a co-supporting component. Likewise known are so-called central tube frames, featuring a central tube extending from the steering head tube to the region of the swinging fork pivot bearing and located above the engine and which can simultaneously be used to contain motorcycle consumables, for example as an oil tank.

A bridged frame featuring an integrated engine oil reservoir is known for example from German patent DE 101 35 931 C2.

A tubular trellis frame as described above is known, for example, from Japanese document JP-08216960 A. This frame has a steering head tube from which upper and lower frame main tubes extend, paired so that the aperture angle between the two frame main tubes exceeds 90 degrees in the direction of the longitudinal extension, the frame main tubes being interconnected by frame struts.

Known from Japanese document JP-09095284 is a tubular trellis frame featuring a steering head tube from which upper and lower frame main tubes extend, the upper and lower frame main tubes being interconnected by frame struts.

Known from Japanese document JP-011067789 A is a central tube frame, the central tube of which has a rectangular cross-section and extends from a steering head tube and featuring triangular links to which the engine of the motorcycle can be secured.

Suggested by U.S. Pat. No. 5,845,728 is a frame strut for a motorcycle, featuring a curved central tube extending from the steering head tube to the swinging fork pivot bearing. Extending away from a triangular composite assembly between the steering head tube of this frame are side links to which the engine can be secured.

A further motorcycle frame is known which features a steering head tube from which tubes in a three-dimensional lattice composite assembly extend in the form of frame main tubes interconnected by frame struts. The frame main tubes are upper and lower frame main tubes running essentially parallel along a portion of their longitudinally extent from the steering head tube. The motorcycle featuring this motorcycle frame finds application both on the road as a long-distance enduro and off the road. This known lightweight motorcycle frame features a high torsional rigidity but is characterized by being engineered as a tubular trellis frame with a plurality of tubes which need to be interwelded and thus complicating fabrication.

Against the foregoing backround, the apparatus of the present disclosure has the object of sophisticating the known motorcycle frame so that, although the total number of tubes joined into a trellis composite arrangement is reduced, improved strength performance is achieved without adding to the mass of the motorcycle frame.

SUMMARY OF THE INVENTION

There is provided a motorcycle frame comprising tubes extending away from a steering head tube in a three-dimensional trellis composite assembly of frame main tubes interconnected by frame struts, pairs of upper and lower frame main tubes being oriented parallel along at least one portion of their longitudinal extents, wherein a single tube oriented essentially parallel to the lower frame main tubes is disposed between the upper frame main tubes and the steering head tube.

The motorcycle frame provided for in accordance herewith features between the upper frame main tubes, extending away from the steering head tube, a single tube secured to the steering head tube (for example by a weld). The upper frame main tubes may be defined, for example by means of a weld, at the portion extending away from the steering head tube, which may be the end portion of the single tube. The motorcycle frame in accordance with the present disclosure also has two lower frame main tubes extending away from the steering head tube and oriented at least along a portion of the longitudinal extent away from the steering head tube parallel to the upper frame main tubes.

The single tube connecting the upper frame main tubes to the steering head tube, for inducing moments and forces, likewise is oriented substantially parallel to the lower frame main tubes in creating—as distinguished from known tubular trellis frames—a motorcycle frame with added torsional rigidity despite a reduced mass and reduced number of tubes to be interconnected for the motorcycle frame.

It thus has been determined that compared to known tubular trellis frames as described above, the motorcycle frame in accordance herewith features an approximately 30% higher rigidity, yet a reduced mass. Further, due to the reduced number of tubes, the presently disclosed motorcycle frame has just sixteen tubes whilst the known motorcycle frames commonly have twenty-two tubes. The present frame thus can be fabricated faster, and because of the fewer number of welds between the individual tubes, problems of thermal distortion assocaited with welds is significantly reduced.

In accordance with a further embodiment of the apparatus, it is provided that the single tube is configured open at a rear end portion, opposite the steering head tube, and is engineered to receive a means for scavenging oil from an oil/gas mixture from an engine transmission assembly of a motorcycle provided with the disclosed motorcycle frame. Environmental protection requirements make it necessary to separate the oil/gas mixture forming (for example in the crankcase) in the motorcycle engine, and to return the scavenged oil to the engine formed as an engine transmission assembly. The gas remaining after scavenging of the oil very preferably is fed to the engine combustion.

It is thus the case that the motorcycle frame in accordance herewith, in addition to improving the torsional rigidity, also creates a functional integration since in the interior space of the single tube (connecting the steering head tube and the upper frame main tubes), an oil scavenger can now be accommodated serving to separate the oil and gas of the oil/gas mixture. For this purpose the interior space of the single tube can be configured in shape and size complementary to the oil scavenger, so that the oil scavenger can be releasably, frictionally, attached into the single tube by means of a simple clamp fastener. The preassembled oil scavenger simply may be inserted into the open end of the single tube, where it is releasably attached in the single tube by additonal means of a simple clamp fastener. Via, for example, flexible tubing an engine breather can then be fluidly communicated to the oil scavenger, which is connected via further flexible tubing to an airbox of the motorcycle engine and ported by means of a further, for example, to be cited flexible tubing to the engine or transmission via which engine oil scavenged by the oil scavenger is returned to the oil circuit of the engine or engine transmission assembly.

In another further embodiment of the apparatus, it is provided that a longitudinal centerline of the single tube makes an angle of preferably approximately 90 degrees with a longitudinal centerline of the steering head tube. This is of advantage for fabrication, since this permits avoiding formation of a complicated three-dimensional surface joining the single tube to the steering head tube, and thus reducing the complications and costs involved in fabrication.

Similarly, it is provided that the lower frame main tubes, in a triangular composite assembly with a stiffener plate disposed between the frame main tubes, extends away from the steering head tube and a plane defined by the triangular composite assembly intersects the longitudinal centerline of the steering head tube at an angle of essentially 90 degrees. Here too, this is of advantage to fabrication, since elimination of a complicated three-dimensional surface, joining the lower frame main tubes to the steering head tube, simplifies fabrication whilst the stiffener plate disposed between the frame main tubes enhances the flexural rigidity of the motorcycle frame.

The single tube is connected, for example by a weld, to an upper region of the steering head tube. The frame in accordance herewith is in a further embodiment characterized in that frame struts extend from the lower frame main tubes in the direction of the junction of the single tube with the steering head tube, creating between the steering head tube and each lower frame tube and frame strut a triangular composite assembly which enhances the flexural rigidity of the motorcycle frame.

In accordance with yet a further embodiment of the apparatus, it is provided that the lower frame main tubes feature, along their longitudinal extent away from the steering head tube, a first constricting portion diminishing an aperture angle between the lower frame main tubes, so that the lower frame main tubes are oriented with their spacing becoming larger (proceeding longitudinally rearward in the direction away from the steering head tube) up to a second constricting portion, after which the spacing between the lower frame main tubes decreases longitudinally. Thus, the lower frame main tubes define, along their longitudinal extents from the steering head tube, first constricting portions which diminish the aperture angle defined between the lower frame main tubes, so diverging portions of the lower frame main tubes are oriented such that a spacing between the lower main frame tubes increases in the rearward longitudinal direction from the steering head tube, to second constricting portions whereafter converging portions of the lower main tubes are oriented so that a spacing between the lower frame main tubes decreases in the rearward longitudinal direction from the steering head tube.

As explained previously, the lower frame main tubes extend from their junction at the steering head tube at an angle of about 90 degrees to the longitudinal centerline of the steering head tube. The lower frame main tubes define between them an aperture angle, resulting in the clearance between the lower frame main tubes quickly becoming larger (beginning from the steering head tube in the longitudinal direction of the lower frame main tubes), so that space is created between the lower frame main tubes for accommodating, for example, a cylinder head of an internal combustion engine.

In this arrangement, the frame main tubes are oriented longitudinally away from the steering head tube up to a first constricting portion, which is a transition to which the clearance between the frame main tubes continues to increase, but at a smaller rate than in the portion before (in front of) the first constricting portion (i.e., when viewed in the longitudinal direction of the lower frame main tubes). As viewed from the steering head tube in the longitudinal direction of the frame, the spacing between the lower frame main tubes, after (rearward) of the second constricting portion, again decreases. So, the frame according to this disclosure features a widest location in the region of the second constricting portion, which narrowers both towards the steering head tube and away from the steering head tube.

In accordance with still another further embodiment of the apparatus, the motorcycle frame also features frame struts extending between the lower frame main tubes in the region of the first constricting portion and the portion of the single tube opposite the steering head tube, so that also as viewed in the longitudinal direction of the frame, a triangular configuration is obtained between the lower frame main tubes and the upper single tube—thus creating a torsional rigid configuration.

In accordance with an advantageous further embodiment, it is provided for that frame struts extend from the lower frame main tubes in the direction away from the single tube and in the direction of a longitudinal centerplane of the motorcycle frame including the longitudinal centerline of the steering head tube; the frame struts can serve to secure the motorcycle engine. In this arrangement, these engine mounting struts may be individual single tubes defined at the lower frame main tubes, for example by a weld or also a prefabricated triangular configuration, with a tension strut at which the engine can be disposed and comprising two engine mounting struts extending to each of the lower frame main tubes.

In accordance with still another further embodiment, it is provided for that the upper frame main tubes extend from the end portion, opposite the steering head tube in the direction away from the single tube and parallel to the lower frame main tubes, a portion of each upper support for a rear extension arm are downswept in the direction of the lower frame main tubes.

A rear extension arm can be releasably secured to the motorcycle frame, for example by bolt fasteners, for mounting further components of a motorcycle featuring the motorcycle frame in accordance herewith, for example, a rear fender or the like. The upper frame main tubes may then oriented from the rear end portion of the single tube opposite the steering head tube in the direction as well as from the single tube, and parallel to the lower frame main tubes, to then extend as of the portion of each upper support for the rear extension arm at the upper frame main tubes in the direction of the lower frame main tubes. Accordingly with this configuration, there may be formed, in the region of each lower support for the rear extension arm, a joint for the lower frame main tubes.

The aforementioned rear extension arm can then be defined at the upper and lower supports, and the motorcycle frame in accordance with this disclosure then forms, on both sides of the longitudinal centerplane of the frame including the steering head tube between the upper frame main tube and lower frame main tubes on both sides, a triangle formed from each upper frame main tube, each lower frame main tube and a further frame strut closing off the triangle between the upper and lower frame main tubes, forming along its longitudinal extent a mount for receiving the bearing of a rear swinging fork of the motorcycle.

In this arrangement, it is furthermore provided for in a further embodiment that the upper and lower frame main tubes are each connected by means of the aforementioned frame strut, which is downswept from each upper support for the rear extension arm at each upper frame main tube inclined, and extending beyond each lower frame main tubes, and featuring in the region of its longitudinal (rearward) extent the mount for a bearing of a rear wheel compliance member of the motorcycle (e.g. the aforementioned rear swinging fork).

The aforementioned frame struts can be connected at the end portion opposite the upper support by means of a crosstube, at which a mount for an engine transmission assembly of the motorcycle can be attached. These frame struts can also be used in the region of their end opposite the upper support of the rear extension arm to attach footrests for support of the biker.

In still another further embodiment of the present apparatus, it is provided that between the crosstube and the upper frame main tubes, in the region of the lower support for the rear extension arm, a frame strut is arranged in each case configured as a tension strut.

In yet a further embodiment of the disclosed apparatus, it is also provided for that frame struts extend from the lower frame main tubes to the upper frame main tubes in the region of their junction at the single tube. The frame struts serve to further brace the motorcycle frame, thus serving, for example, to withstand torsional stress introduced via the rear swinging fork pivot bearing in the form of tension and compressive forces, respectively (depending on the torsioning direction between the upper and lower frame main tubes).

In a similar way in accordance with yet another further embodiment of the apparatus, it is provided for that frame struts extend from the lower frame main tubes to the frame struts, oriented inclined in the region of their junction at the upper frame main tubes, and thus communicating tension forces and compression forces, respectively, between the lower frame main tubes and the downswept inclined frame struts constituting the mount for the swinging fork pivot bearing.

The single tube connecting the steering head tube to the upper frame main tubes may, depending on the embodiment, feature a circular cross-section. However, in a preferred embodiment it is provided for that the single tube has a polygonal cross-section, particularly an inner circumferential surface having eight flats, e.g., defining an octagon. In the interior space of this single tube with its polygonal cross-section, the oil scavenger as aforementioned may be inserted.

Known motorcycle frames arranged in a three-dimensional trellis composite arrangement have upper frame main tubes directly connecting the steering head tube. As viewed in the longitudinal rearward direction of the motorcycle frame, these upper frame main tubes feature at the steering head tube a clearance corresponding to the clearance between the lower frame main tubes. One such known motorcycle frame was mentioned at the outset with reference to, for example, the Japanese documents JP-08216960 A or JP-09095284 A.

When such a known motorcycle frame is engineered in a motorcycle intended for sports activities in mixed operation on and off the road involving leaping requiring frequent nimble changes in direction and handling, whereby the rear wheel of the motorcycle is drifting, known motorcycle frames are unsuitable and at a disadvantage. A motorcycle required to meet such dynamic performance requirements is termed, for example, a supermoto or supermotard requiring the biker, although seated stationary, to continually change his seating posture relative to the fuel tank of the motorcycle in many riding movements or manoeuvres.

If such a motorcycle is engineered with a known "wide angle" frame sited ahead of the seated biker in the forwards direction of travel, as explained above, then a fuel tank disposed between the steering head tube and the seat assembly for the biker needs to be fitted either between the upper and lower frame main tubes, as is described, for example, in Japanese document JP-09095284 A.

Alternatively in the art, the fuel tank needs to straddle the upper frame main tubes by its side tanks. When the fuel tank is disposed between the upper and lower frame main tubes, the biker is continually in contact with the upper frame main tubes by the inside of his thighs, and thus misses desirable knee contact between the fuel 5 tank and inner side of the thighs or knees for dynamic handling and feedback from the motorcycle. Such a configuration would result in the biker substantially lacking feedback from the motorcycle. When the fuel tank straddles the upper frame main tubes by its side tanks the fuel tank needs to be configured exceptionally "wide-angled" likewise making the wanted biker knee contact with the fuel tank impossible.

Here too, the motorcycle frame in accordance herewith helps in resolving this problem, since engineering the frame with a single tube between the steering head tube and the two upper frame main tubes makes it possible to fit a slender saddle tank to the motorcycle frame, permitting snug knee contact of the biker with the saddle tank—thus ensuring a good feedback. This also permits the fuel tank to be engineered to be slender laterally, without having to sacrifice tank capacity. This is because the fuel tank arranged as such is able to straddle and thus include the single tube between the steering head tube and upper frame main tube, sited in a recess at the underside of the fuel tank.

In accordance with a further embodiment of the apparatus, the motorcycle frame is free of frame main tubes and/or frame struts fully enclosing a engine transmission assembly. A motorcycle frame in accordance with the invention thus is not downswept to fully enclose the engine or a engine transmission assembly.

In addition, the invention also defines together with a front wheel and a rear wheel as well as an engine transmission assembly a motorcycle featuring a motorcycle frame as detailed above. The motorcycle as provided in accordance with the invention can feature a fuel tank disposed between the steering head tube of the motorcycle frame and a seating surface supported by the motorcycle frame as already discussed above, the underside of which is recessed to enclose the single tube extending away from the steering head tube and connected to the upper frame main tubes at least substantially. This now results in the fuel tank having a decidedly slender configuration in the forwards direction permitting snug knee contact of the biker with the fuel tank even though it has a capacity of, for example, twelve liters.

This motorcycle as provided in accordance herewith now permits excellent highly dynamic handling as wanted, for example, in the supermoto range. This is because the motorcycle engineered with the present motorcycle frame has a torsionally rigid response, thus relieving the biker of having to wait for delayed response due to slow recovery of the motorcycle frame from elastic deformations or having to counteract such elastic deformations by changing his seating posture.

BRIEF DESCRIPTION OF THE DRAWINGS

The accompanying drawings, which are incorporated into and form a part of the specificationn, are for the purpose of illustrating a preferred embdoiment of the invention, and are no to be construed as limiting the invention. The invention will now be detailed with reference to the drawing in which.

DESCRIPTION OF THE PREFERRED EMBODIMENTS (BEST MODE FOR PRACTICING THE INVENTION)

Figure 1:
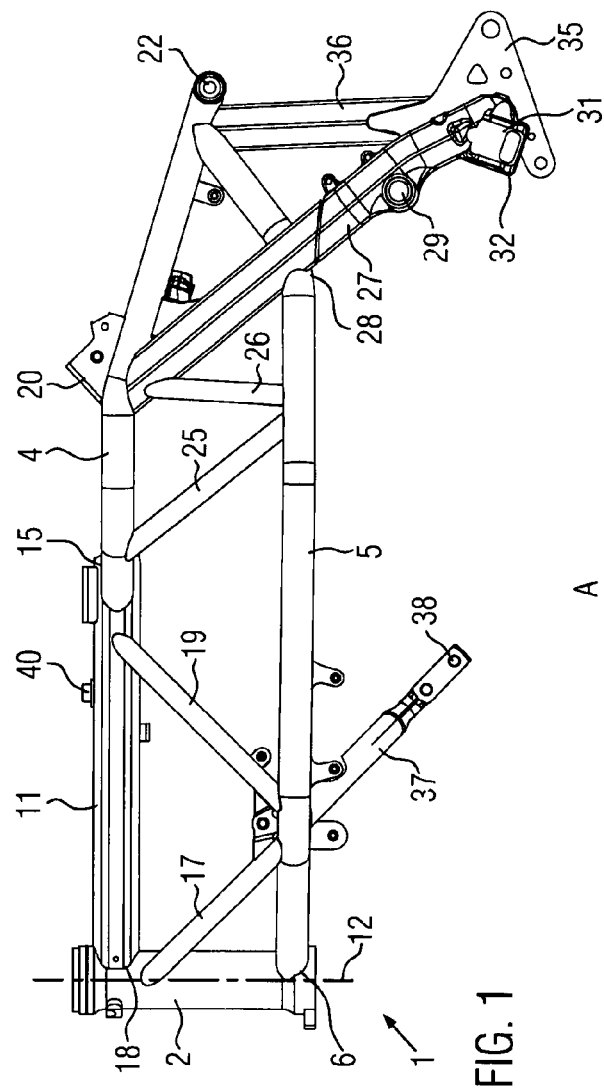
FIG. 1 is a side view of one embodiment of the motorcycle frame in accordance with the invention.
Figure 2:
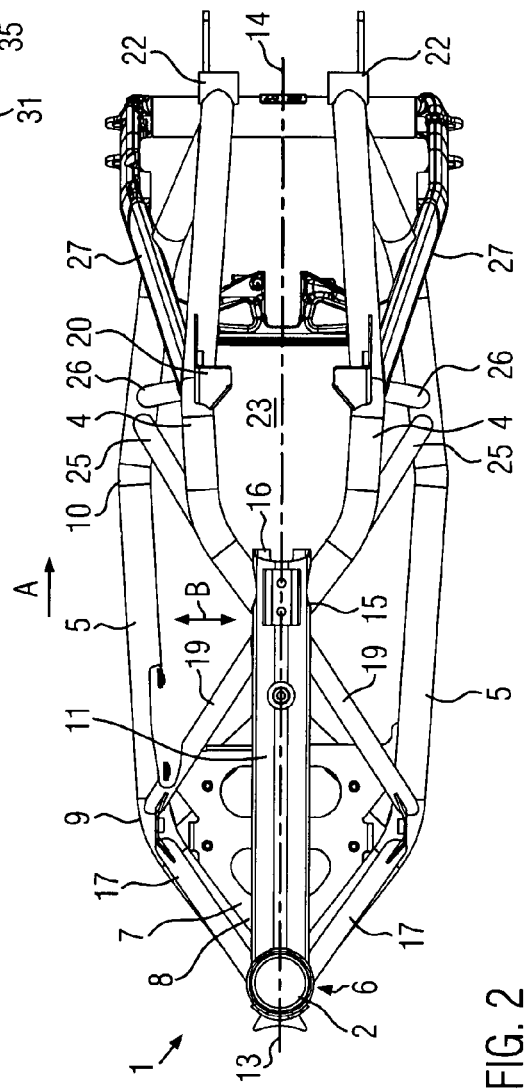
FIG. 2 is a top-down view of the motorcycle frame.
Figure 3:
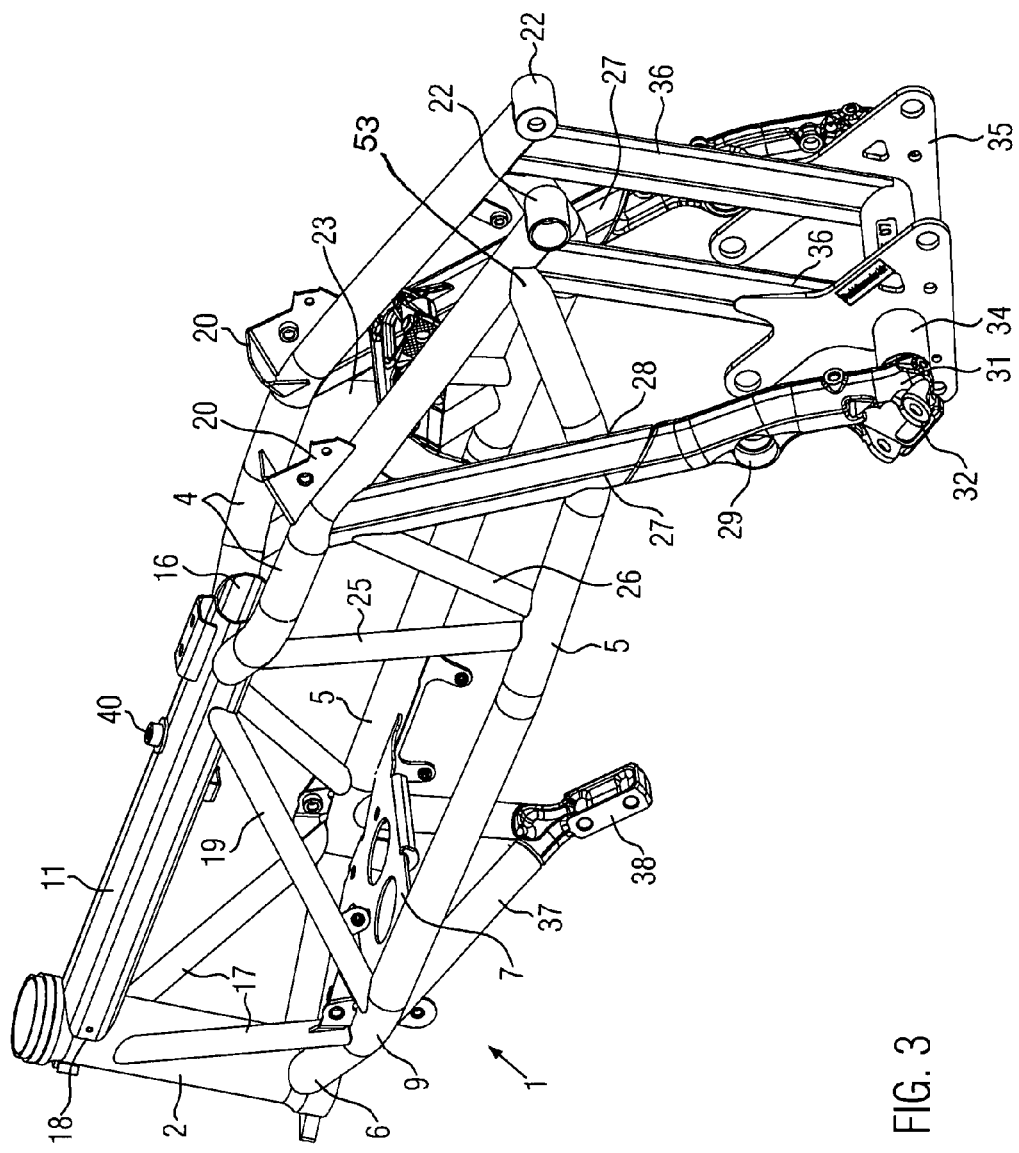
FIG. 3 is a view in perspective of the motorcycle frame.

The motorcycle frame in accordance with the invention will now be detailed by way of the example embodiment with reference to the FIG. 1, FIG. 2 and FIG. 3. In this disclosure and in the claims, the terms "front," "rear," have their ordinary meaning in relation to a motorcycle's configuration, e.g., "rear" or "rearward" means to the right in FIG. 6.

Figure 6:
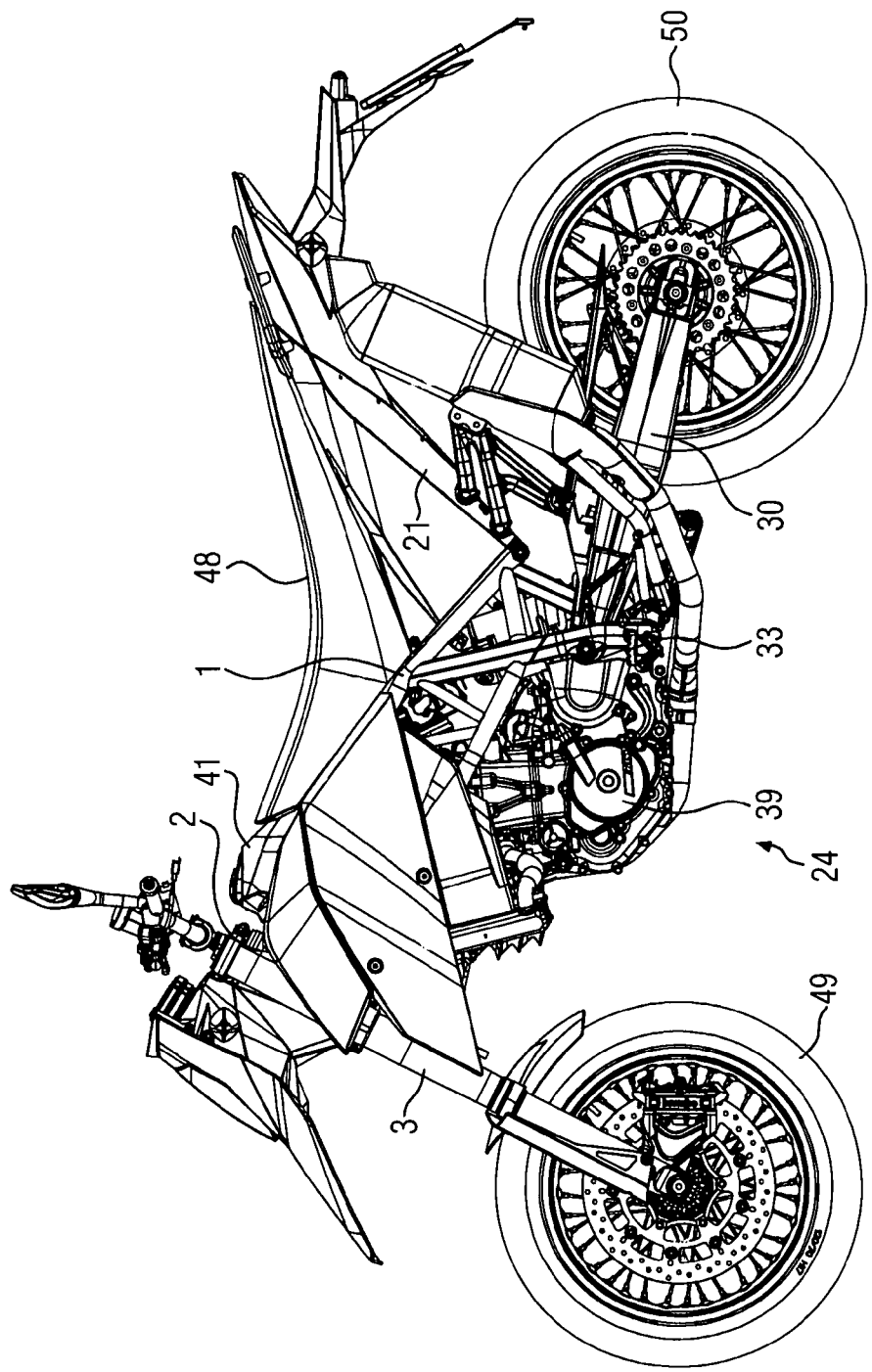
FIG. 6 is a side view of a motorcycle featuring the motorcycle frame in accordance with the invention.

The motorcycle frame 1 features a steering head tube 2 serving to mount steering head bearings in the form of rolling contact bearings (not shown) with which a telescopic fork 3 is rotatably mounted as evident from FIG. 6 in detail.

The motorcycle frame 1—also termed frame 1 in the following disclosure—features two upper frame main tubes 4 and two lower frame main tubes 5.

In this arrangement, the pair of lower frame main tubes 5 extend rearward from the steering head tube 2, in the longitudinal direction of the frame 1 from their joint or junction at the steering head tube 2 and away from the steering head tube 2. The connection of the lower frame main tubes 5 with the steering head tube 2 may be made by a weld, such that the lower frame main tubes 5 are defined at the side of the steering head tube 2 by means of circumferential welds. The configuration can be selected such that the steering head tube 2 and the two lower frame main tubes 5 form in their joint 6 a triangular composite assembly in which a stiffener plate 7 is included.

In this arrangement, the pair of lower frame main tubes 5 extend away from the steering head tube 2, and define therebetween an aperture angle 8. Preferably, the aperture angle is subtended by the two lower frame main tubes 5 up to the region of a first constricting portion 9. Starting at the steering head tube 2 and proceeding rearward, the clearance between the two lower frame main tubes 5 in the longitudinal direction of the frame 1, as indicated by the arrow A (FIG. 2), continually increases up to the first constricting portion 9. From the first constricting portion 9 and progessing further rearward (again as as viewed in the direction of the arrow A) the clearance distance (laterally in the direction of the double arrow B) between the lower frame main tubes 5 further increases, but not at the same rate of increase as is the case between the steering head tube 2 and the first constricting portion 9. Starting from the first constricting portion 9, the lower frame main tubes 5 extend linearly in the longitudinal direction rearward as indicated by the arrow A, up to a second constricting portion 10. The two lower frame tubes thus subtend a smaller aperture angle in this intermediate region of the frame. Referring still to FIG. 2, beginning at the second constricting portions 10 and progressing rearward in the direction of the arrow A, the clearance between the two lower frame main tubes 5 decreases in the direction of the double arrow B.

In the region of the upper end of the steering head tube 2, a single tube 11 is provided connecting the steering head tube 2 to the two upper frame main tubes 4 as seen in FIG. 2. In this arrangement the location of the single tube 11 at the steering head tube 2 can be likewise dictated by means of a weld, such that a longitudinal centerline of the single tube 11 preferably defines an angle of approximately 90 degrees with the longitudinal centerline 12 of the steering head tube 2 as evident from FIG. 1.

FIG. 2 also illustrates how the single tube 11 extends longitudinally rearward from the steering head tube 2 in the direction of the arrow A, such that the longitudinal centerline 13 of the single tube 11 coincides with a longitudinal imaginary centerplane 14 of the frame 1 (i.e. as viewed in the longitudinal direction of the frame 1 running in the middle of frame 1). The upper frame main tubes 4 and the lower frame main tubes 5 preferably extend, along a portion of their longitudinal extent, parallel to each other as is evident from the side view in FIG. 1.

The joint or junction 15 between the pair of upper frame main tubes 4 and the single tube 11 is located near an open rear end portion 16 of the single tube 11. Disposed between the steering head tube 2 and the two lower frame main tubes 5 are a pair of front frame struts 17. The front frame struts 17, which offer rigid connection between the lower frame main tubes 5 and the steering head tube 2, extend from the region of the first constricting portion 9 up to the vecinity of the junction 18 of the single tube 11 with the steering head tube 2. In this region the two front frame struts 17, the steering head tube 2 and the lower frame main tubes 5 form a triangular composite assembly.

A similar triangular composite assembly is also formed between a pair of first intermediate frame struts 19, the two lower frame main tubes 5 and the stiffener plate 7, the frame struts 19 extending for this purpose from the region of the first constricting portion 9 of the lower frame main tubes 5 to the single tube 11, i.e. up to roughly the joint 15 between the single tube 11 and the two upper frame main tubes 4.

Referring to FIGS. 1 and 2, the pair of upper frame main tubes 4 are oriented in this arrangement (as viewed in the longitudinal direction A of the frame 1) extending rearward from the junction 15. The upper frame main tubes 4 run parallel to the two lower frame main tubes 5, until the regions of upper supports 20 is reached. The upper supports 20 are for a rear extension arm 21 (FIG. 6) upon which further components of the motorcycle, such as, for example, a rear fender or the like, can be provided. As directly evident from FIG. 1 and FIG. 3, the two upper frame main tubes 4 are downswept roughly rearward of the region of the upper supports 20. Rearward of the upper supports 20, the upper frame main tubes are inclined down to the lower frame main tubes 5 (FIG. 1). The end portions of the upper frame main tubes 4 feature lower supports 22 for receiving the rear extension arm 21.

FIG. 2 and FIG. 3 show that in this frame, the two upper frame main tubes 4 form in the region of their longitudinal extent between the joint 15 at the single tube 11 and the two lower supports 22 for the rear extension arm 21 a receiving space 23 for accommodating an airbox of the motorcycle 24.

Oriented between the two lower frame main tubes 5 and the two upper frame main tubes 4 in each case are a pair of second intermediate frame struts 25. As best seen in FIGS. 1 and 2, the second intermediate frame struts 25 preferably are situated at angles to coresponding upper frame main tubes 4 and lower frame main tubes 5. In a similar way, a pair of third intermediate frame struts 26 are oriented between the lower frame main tubes 5 and the two side frame struts 27, extending away from the upper frame main tubes 4. As evident from FIG. 1 to FIG. 3, the pair of side frame struts 27 connect the upper frame main tubes 4 to the lower frame main tubes 5, and are downswept, via joints 28 between the lower frame main tubes 5 and the side frame struts 27, in the yaw direction of the frame 1. Each of the side frame struts 27 angles down to a mount 29 for mounting a rear wheel compliance, for example in the form of the swinging fork 30 as shown in FIG. 6. The mount 29 is penetrated by a pin (not shown) serving to define the rotational location of the swinging fork 30 whilst simultaneously handling the supporting function of the engine transmission assembly 39.

Referring now to FIG. 6 of the drawing, there is illustrated how the side frame struts 27 feature at their respective end portions 31 a mount 32 for footrests 33. Cross-sectionally, the side frame struts 27 preferably are configured elliptically, resulting in, on the one hand, a slender configuration, on the other, in an increase in the longitudinal rigidity of the frame 1 as a whole. Reference numeral 51 identifies an upper mount for a spring damper 52 as shown in FIG. 6. The upper mount 51 may be a forged component connected to the upper frame main tubes 4 as well as the side frame struts 27, whilst simultaneously enhancing the rigidity of the frame 1 on the sides and crosswise.

In addition the two side frame struts 27 are interconnected at their end portions by means of a crosstube 34, for attachment to the mount 35 for an engine of the motorcycle 24 or engine transmission assembly 39 of the motorcycle 24. Also extending between the two end portions, by the lower supports 22 and the crosstube 34, are rear frame struts 36 in the form of tension struts.

As evident from FIG. 1 and FIG. 3 of the drawings, in particular further frame struts or engine struts 37 extend from the two lower frame main tubes 5 in the yaw direction of the frame 1 as viewed downwards (i.e. from the first constricting portion 9) to define by means of a connecting member 38 the end for the engine transmission assembly 39 of the motorcycle 24. The engine transmission assembly 39 is then mounted via the connecting member 38, mount 29 for the rear wheel swinging fork 30, and the mount 35 such that the engine transmission assembly 39 is subjected only to tensile loads originating in the riding dynamics of the motorcycle 24.

Figure 5:
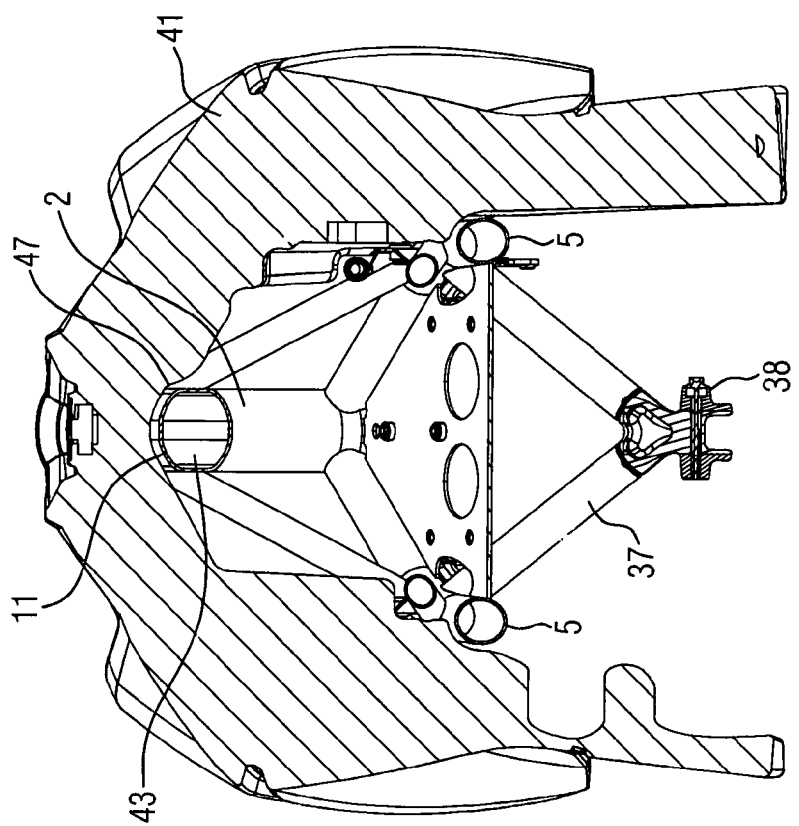
FIG. 5 is a cross-sectional view of a fuel tank arranged on the motorcycle frame.

Via a fastening location 40 located at the upper side of the single tube 11, a fuel tank 41 as seen in FIG. 6 may be provided on the motorcycle 24 as shown in more detail in FIG. 5 of the drawing.

Figure 4:
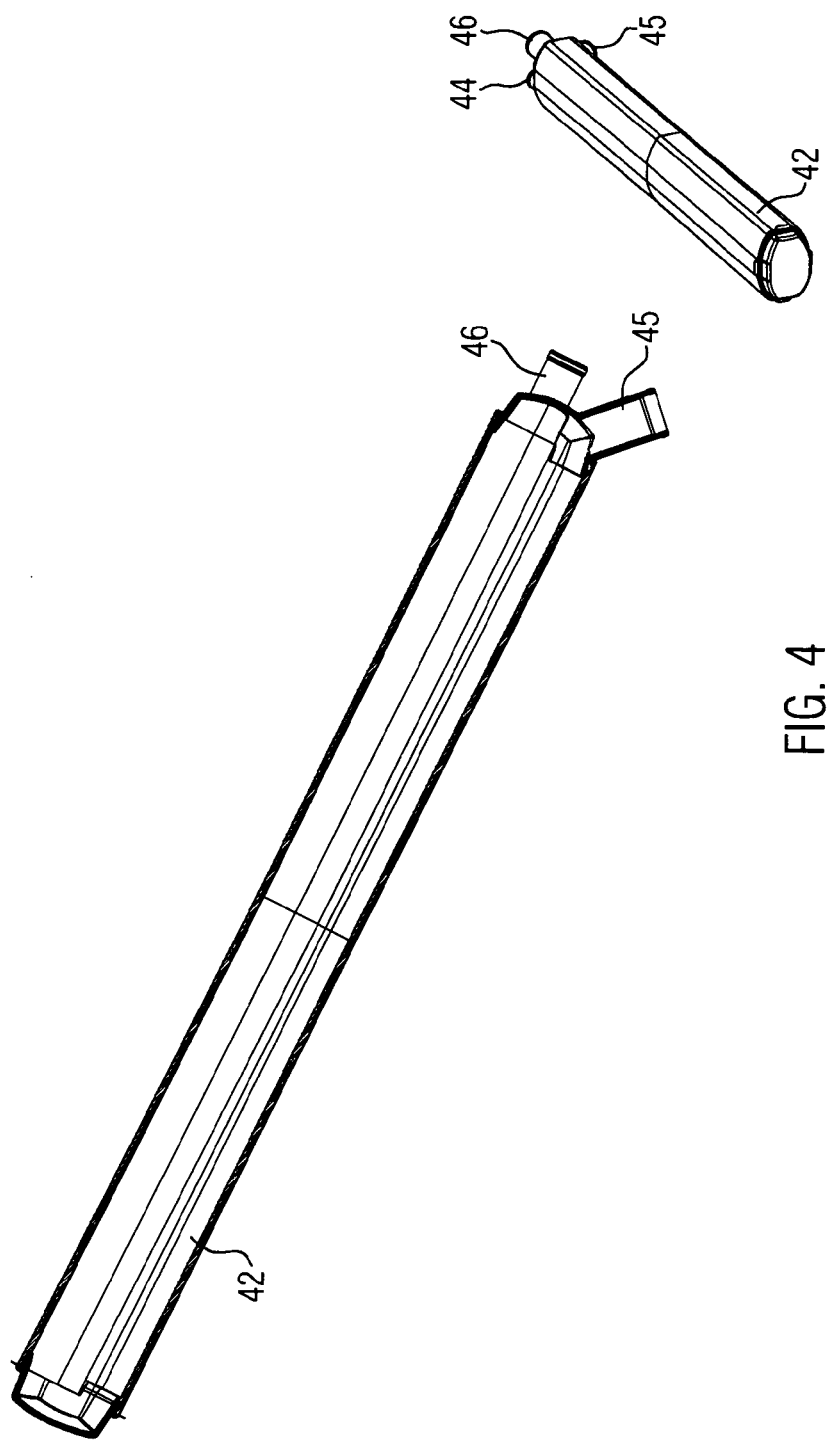
FIG. 4 is a section view through an oil scavenger as may be accommodated in a tube of the motorcycle frame.

Referring now to FIG. 4 of the drawing, there is illustrated a means 42 for scavenging oil from an oil/gas mixture of the engine transmission assembly 39. As evident from the view in perspective of the FIG. 4, the oil scavenger 42 is engineered to fit in an interior space 43 of the single tube 11. The oil scavenger 42 is configured in shape and size for releasable, frictional insertion into the interior space 43 through the open rear end portion 16 of the single tube 11, where it may be clamped in place. As indicated in FIG. 4, the single tube 11 preferably has a polygonal cross-section. The polygonal cross-section defines an inner circumferential surface having, preferably but not by limitation, eight flats. An oil scavenger 42 having a complementary (e.g. octagonal) exterior thus inserts into the tube 11.

An oil/gas mixture ported from the engine transmission assembly 39 of the motorcycle 24 enters via an inlet 44 into the oil scavenger 42 where it is separated, in other words the light gaseous components separated from the heavier oil particles. Once the oil has been scavenged, it can be returned via an outlet 45 and a flexible tubing (not shown) to the engine transmission assembly 39, for example via an inlet in the transmission. The light gaseous components are communicated via an outlet 46 and flexible tubing (not shown) to the airbox located in the receiving space 23 between the two upper frame main tubes 4 and then combustioned by the engine of the engine transmission assembly 39.

Referring now to FIG. 5 of the drawing there is illustrated a section view of the fuel tank 41 arranged in the motorcycle frame 1. As evident from FIG. 5 directly, the fuel tank 41 features at its underside a recess 47 which more or less fully surrounds clasps the single tube 11 located in the middle. If, as compared to this, the fuel tank 41 were mounted on a conventional trellis frame, the recess 47 would have to run from the lower frame main tubes 5 (as viewed in the yaw direction of the motorcycle) up to the upper frame main tubes 4 of the known tubular trellis frame. This would result in a large surface rectangular recess needing to be created, which would significantly reduce the available capacity of the fuel tank 41. Consequently, the fuel tank 41 would have to be made considerably wider (again, as viewed in the yaw direction of the motorcycle) to maintain the tank capacity. This in turn would counteract snug knee contact of the biker on the seat assembly 48 of the motorcycle 24 with the tank.

Referring now to FIG. 6, there is illustrated in conclusion a motorcycle 24 featuring a motorcycle frame 1 in accordance with the invention, with a front wheel 49 and a rear wheel 50 together with the aforementioned engine transmission assembly 39. The motorcycle 24 has a fuel tank 41 situated between the steering head tube 2 and a seat assembly 48 supported by the motorcycle frame 1. The underside of the fuel tank 41 has the aforementioned recess 47 extending from the steering head tube 2 and essentially encloses the single tube 11 connected to the upper frame main tubes 4. This achieves, because of the frame 1 being engineered with a single tube extending from the steering head tube 2 connecting the two upper frame main tubes 4, a slender fuel tank 41 in the portion between the seat assembly 48 and the steering head tube 2 at which a motorcycle frame in accordance with the invention features a three-dimensional trellis composite arrangement.

The motorcycle frame in accordance with this disclosure is characterized by a high torsional rigidity which as compared to the known motorcycle frame assigned to the present applicant is now boosted by 36 percent to a torsional rigidity of essentially 3,000 Newtonmeter per degrees, and this although the mass of the motorcycle frame in accordance with the invention as compared to the known motorcycle frame was even slightly further reduced. The motorcycle frame in accordance with the invention has the advantage of being cost-effective in fabrication, since the number of individual tubes needed to engineer the motorcycle frame in accordance with the invention, as compared to the known motorcycle frame, is reduced.

Moreover, the motorcycle frame in accordance with the invention has the further advantage of functional integration by housing the oil scavenger in the interior space of the single tube extending from the steering head tube to the two upper frame main tubes, now making it possible to create a slender fuel tank at the motorcycle frame featuring a three-dimensional trellis composite arrangement. Because of its high torsional rigidity, a motorcycle engineered with this motorcycle frame features an excellent dynamic handling response. Especially in sports events in the scope of supermotard competition biking, this is a substantial advantage, since the biker of such an engineered motorcycle when dynamically changing directions is no longer hampered by the slow decay of the elastic deformations in the motorcycle frame, as is the case with known frame concepts. The reduced number of individual tubes forming the motorcycle frame in accordance with the invention also reduces production time, because of the fewer number of welds between the individual tubes, whilst also reducing the problems of thermal distortion involved in the many welds.

As regards features of the invention not detailed hitherto express reference is made to the claims and the drawing.

LIST OF REFERENCE NUMERALS 1 motorcycle frame, frame
2 steering head tube
3 telescopic fork
4 upper frame main tubes
5 lower frame main tubes
6 joint, junction
7 stiffener plate
8 aperture angle
9 first constricting portion
10 second constricting portion
11 single tube
12 longitudinal centerline
13 longitudinal centerline
14 longitudinal centerplane
15 joint, junction
16 open end portion
17 front frame struts
18 joint, junction
19 first intermediate frame struts
20 upper support
21 rear extension arm
22 lower support
23 receiving space
24 motorcycle
25 second intermediate frame struts
26 third intermediate frame struts
27 side frame struts
28 joint
29 mount
30 rear wheel compliance member, swinging fork
31 end portion
32 mount
33 footrests
34 crosstube
35 mount
36 rear frame struts
37 frame struts, engine struts
38 connecting member
39 engine transmission assembly
40 fastening location
41 fuel tank
42 oil scavenger 43 interior space
44 inlet
45 outlet
46 outlet
47 recess
48 seat assembly
49 front wheel
50 rear wheel
51 upper spring damper mount
52 spring damper
53 rear joint
A arrow, longitudinal direction
B double crosswise direction Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all patents and publications cited above are hereby incorporated by reference.

What is claimed is:

1. A motorcycle frame comprising:
   tubes extending away from a steering head tube (2) to define a three-dimensional trellis composite assembly comprising:
   a pair of upper frame main tubes (4) interconnected by a plurality of frame struts (19, 25, 26, 27) to a pair of lower frame main tubes (5), the pair of upper frame main tubes and the pair of lower frame main tubes being oriented substantially parallel along at least a portion of their respective longitudinal extents; and
   a single tube (11), oriented substantially parallel to the lower frame main tubes, extending longitudinally from the steering head tube (2) to the pair of upper frame main tubes;
   wherein each of the pair of lower frame main tubes joins directly to the steering head tube.

2. The motorcycle frame as set forth in claim 1, wherein the single tube (11) defines an open rear end portion (16), and further comprising an oil scavenger (42) receivable in the open rear end portion for scavenging oil from an oil and gas mixture from an engine transmission assembly (39).

3. The motorcycle frame as set forth in claim 2, wherein an interior space of the single tube (11) is configured in shape and size complementary to the oil scavenger (42), whereby the oil scavenger is releasably frictionally insertable into the single tube.

4. The motorcycle frame as set forth in claim 1, wherein a longitudinal centerline (13) of the single tube (11) defines an angle of approximately 90 degrees with a longitudinal centerline (12) of the steering head tube (2).

5. The motorcycle frame as set forth in claim 4, further comprising a triangular composite assembly comprising a stiffener plate (7) disposed between the lower main frame tubes and extending rearward from the steering head tube (2), wherein the stiffener plate is within an imaginary plane intersecting the longitudinal centerline (12) of the steering head tube (2), to define an angle between the imaginary plane and the centerline of the steering head tube of approximately 90 degrees.

6. The motorcycle frame as set forth in claim 1, further comprising a junction (18) of the single tube (11) with the steering head tube (2), and wherein the plurality of frame struts comprises a pair of front frame struts (17) extending from the lower frame main tubes (5) substantially toward the junction.

7. The motorcycle frame as set forth in claim 6, the plurality of frame struts further comprising a pair of first intermediate frame struts (19) extending upward and rearward from corresponding ones of the lower frame main tubes (5) to the single tube (11) substantially adjacent to a junction (15) of the single tube with the upper frame main tubes (4).

8. The motorcycle frame as set forth in claim 7, the plurality of frame struts further comprising a pair of second intermediate frame struts (25) extending at inclines from corresponding ones of the lower frame main tubes (5) to the upper frame main tubes (4) substantially adjacent to the junction of the upper frame main tubes with the single tube (11).

9. The motorcycle frame as set forth in claim 1, wherein portions of the lower frame main tubes (5) diverge so that a spacing between the lower frame main tubes increases in the rearward longitudinal direction from the steering head tube (2), and
   wherein the lower frame main tubes, along their longitudinal extents away from the steering head tube, define:
      first constricting portions (9) at which an aperture angle (8) of divergence defined between the lower frame main tubes is diminished; and
      second constricting portions (10) at which portions of the lower frame main tubes are oriented to converge so that the spacing between the lower frame main tubes decreases in the rearward longitudinal direction from the second constricting portions.

10. The motorcycle frame as set forth in claim 9, wherein the plurality of frame struts comprises a pair of first intermediate frame struts (19) extending upward from the lower frame main tubes (5), proximate to the constricting portions (9) of the lower main frame tubes, to a rear end portion of the single tube (11).

11. The motorcycle frame as set forth in claim 1, further comprising: a pair of converging engine struts (37) extending downward and rearward from the lower frame main tubes (5), and toward an imaginary longitudinal centerplane (14) of the motorcycle frame including the longitudinal centerline (12) of the steering head tube (2).

12. The motorcycle frame as set forth in claim 1, wherein the upper frame main tubes (4) comprise: forward portions extending rearward from a rear end portion (16) of the single tube (11) and parallel to the lower frame main tubes (5), and rear portions extending downswept from each of a pair of upper supports (20) for supporting a rear extension arm (21), and in a direction toward the lower frame main tubes, the upper supports being located at respective junctions of the forward portions with the rear portions of the upper frame main tubes.

13. The motorcycle frame as set forth in claim 12, wherein each upper frame main tube (4) is connected to a corresponding one of the lower frame main tubes (5) by a corresponding side frame strut (27), each side frame strut being downswept to incline from each upper support (20) on each upper frame main tube, to extend rearward beyond the lower frame main tubes, and further comprising a corresponding mount (29) for bearing a rear wheel compliance member (30) between a rearward longitudinal extent of each side frame strut and the intersection of each of said side struts with each lower frame main tube.

14. The motorcycle frame as set forth in claim 13, wherein the side frame struts (27) are connected, at respective rear end portions (31) thereof, by a crosstube (34), on which crosstube an engine transmission assembly mount (35) is attachable.

15. The motorcycle frame as set forth in claim 14, further comprising a pair of rear frame struts (36) extending between the crosstube (34) and corresponding ones of the upper frame main tubes (4), proximate to the lower supports (22).

16. The motorcycle frame as set forth in claim 1, wherein the lower frame main tubes (5) and the upper frame main tubes (4) intersect at rear joints (53) proximate to each of two lower supports (22) for a rear extension arm (21).

17. The motorcycle frame as set forth in claim 1, wherein the single tube (11) comprises a polygonal cross-section.

18. The motorcycle frame as set forth in claim 17, wherein the polygonal cross-section defines an inner circumferential surface having eight flats.

19. A motorcycle comprising the motorcycle frame as set forth in claim 1, wherein the motorcycle frame (1) does not fully enclose an engine transmission assembly (39).

20. The motorcycle as set forth in claim 19, wherein the steering head tube (2) is connected to the pair of upper frame main tubes (4), and further comprising a fuel tank (41) disposed between the steering head tube (2) and a seating surface (48) supported by the motorcycle frame (1), the underside of the fuel tank defining a recess (47) to at least partially enclose the single tube (11) extending away from the steering head tube.

* * * * *